(12) United States Patent
Lewis et al.

(10) Patent No.: US 10,303,740 B2
(45) Date of Patent: May 28, 2019

(54) AUTONOMOUS DOCUMENT FORMATTING MECHANISM

(71) Applicants: Harry Reese Lewis, Longmont, CO (US); Reinhard Heinrich Hohensee, Boulder, CO (US); Roger Lee Buis, Clarksville, TN (US)

(72) Inventors: Harry Reese Lewis, Longmont, CO (US); Reinhard Heinrich Hohensee, Boulder, CO (US); Roger Lee Buis, Clarksville, TN (US)

(73) Assignee: Ricoh Company, Ltd., Tokyo (JP)

( * ) Notice: Subject to any disclaimer, the term of this patent is extended or adjusted under 35 U.S.C. 154(b) by 96 days.

(21) Appl. No.: 15/340,184

(22) Filed: Nov. 1, 2016

(65) Prior Publication Data
US 2018/0121142 A1  May 3, 2018

(51) Int. Cl.
*G06F 3/12* (2006.01)
*G06F 17/21* (2006.01)

(52) U.S. Cl.
CPC .................................. *G06F 17/21* (2013.01)

(58) Field of Classification Search
CPC ..... G06F 3/1206; G06F 3/1246; G06F 3/1288
See application file for complete search history.

(56) References Cited

U.S. PATENT DOCUMENTS

| | | | |
|---|---|---|---|
| 8,194,269 B2 | 6/2012 | Kim et al. | |
| 8,587,800 B2 | 11/2013 | Chae | |
| 8,908,209 B2 | 12/2014 | Gaertner et al. | |
| 8,976,385 B2 | 3/2015 | Murayama et al. | |
| 9,152,619 B2 | 10/2015 | Meschkat | |
| 2005/0125728 A1* | 6/2005 | Peiro | G06F 17/2247 715/235 |
| 2007/0002356 A1 | 1/2007 | Ha | |
| 2008/0037047 A1* | 2/2008 | Condon | G06F 17/211 358/1.13 |
| 2011/0161842 A1 | 6/2011 | Prebble | |
| 2013/0155436 A1* | 6/2013 | Gaertner | G06F 3/1208 358/1.13 |
| 2015/0220285 A1* | 8/2015 | Hohensee | G06F 3/1206 358/1.15 |

\* cited by examiner

*Primary Examiner* — Kent Yip
(74) *Attorney, Agent, or Firm* — Jaffrey Watson Mendonsa & Hamilton LLP

(57) ABSTRACT

A method is disclosed. The method includes receiving Final Form presentation document data and inserting one or more alternate Mark-Up formats at each of one or more document components identified in the document data.

25 Claims, 4 Drawing Sheets

```
Begin Document Part (Named Page Group in AFP)
                                                  310      320
    Begin Object Container, type=ALT_DOC
        Alt-use=Null, Alt-type=XHTML+zip, Alt-loc=Null
330 →  Object Container Data (the mark-up document e.g. XHTML+zip)
    End Object Container
    ...
    Begin Page
    Presentation Text Object...
    End Page
```

Figure 3

```
Begin Document Part (Named Page Group in AFP)
                                                  310                        420
    Begin Object Container, type=ALT_DOC
        Alt-use=Null, Alt-type=XHTML+zip, Alt-loc=URL
430 →  Object Container Data (the URL http://bigbank.com/alt/FILE_ID101...)
    End Object Container
    ...
    Begin Page
    Presentation Text Object...
    End Page
```

Figure 4

```
Begin Print File
Print File Resources
    Begin Object Container, type=AltDocIndex        ─510
530──▶  Object Container Data (table...)
        Doc-part=(1-n), Alt-use=(optional), Alt-type=(type), Alt-loc=(loc)
        Doc-part=(1-n), Alt-use=(optional), Alt-type=(type), Alt-loc=(loc)
        Doc-part=(1-n), Alt-use=(optional), Alt-type=(type), Alt-loc=(loc)
        ...
    End Object Container
    ...
Begin Document
Begin Page
```

AUTONOMOUS DOCUMENT FORMATTING MECHANISM

FIELD OF THE INVENTION

The present invention relates to the field of document file format, printing, and in particular, to Advanced Function Presentation data.

BACKGROUND

There has traditionally been two major approaches for representing document content. These approaches include Final Form (e.g. Advanced Function Presentation (AFP) and Portable Document Format (PDF)) and Mark-Up (e.g. Hypertext Markup Language (HTML), Extensible Hypertext Markup Language (XHTML), Extensible Markup Language (XML), ePub, etc.). In a page environment (e.g., print, Acrobat, etc.), the Final Form specification assures precise placement and control of visual appearance, while in a non-page environment a Mark-Up language describes structure and semantics that facilitate adaptation such as reflow (e.g., screen size) and orientation (e.g., portrait or landscape).

The flexibility of the Mark-Up format not only enables web content on a diverse set of devices, but may also be leveraged to address accessibility needs such as low vision (e.g., zoom, contrast), dyslexia (e.g., font), color blindness (e.g., color scheme), and general blindness (e.g., annunciation). Much effort has gone into defining rules for extracting structure and semantics from Final Form documents by retrofitting tags to promote "accessibility" (e.g., PDF/UA). Thus, a derivation of a Mark-Up format from Final Form is fraught with issues, such as dealing with tables that span pages, content "artifacts" (e.g., header, footer, page num., etc.) and reading order for marked content that may otherwise be encountered randomly throughout a data stream. Even when these rules have been clarified, understood and implemented, the Final Form document is ultimately cluttered with unwanted tags. This results in additional steps (e.g., stripping (tags)) prior to print production.

Nonetheless, generalized efforts to tag Final Form data often result in the Mark-Up format being more suitable for one particular need due to disabilities. Ideally, a given document would be developed with alternate formats optimized for an intended use such as printing (for sighted users), annunciation (for blind users), contrast, color-blind, low vision etc. Moreover, fidelity is a concern whenever two or more parties reference a document simultaneously. For instance, content referred to as "Page 3, Paragraph 1" by someone reading a Final Form printout may appear as "Paragraph 8" in alternate Mark-Up.

Consider a use case in which a banking or utilities customer initiates a support call referencing their latest monthly statement. Depending on configured preferences, the customer may have received print, HTML or an alternate (e.g., assessable) format. A document format that effectively links a Final Form document with alternate Mark-Up formatting would enable the call center to access the document in the exact format being used by the customer.

Accordingly, a document format that can simultaneously represent Final Form and an alternate Mark-Up is desired.

SUMMARY

In one embodiment, a method is disclosed. The method includes receiving Final Form presentation document data and inserting one or more alternate Mark-Up formats at each of one or more document components identified in the document data.

BRIEF DESCRIPTION OF THE DRAWINGS

Embodiments of the present invention may be understood more fully from the detailed description given below and from the accompanying drawings of various embodiments of the invention. The drawings, however, should not be taken to be limiting, but are for explanation and understanding only.

FIG. 3 illustrates one embodiment of code implemented to simultaneously represent Final Form and Mark-Up documents;

FIG. 4 illustrates another embodiment of code implemented to simultaneously represent Final Form and Mark-Up documents;

DETAILED DESCRIPTION OF THE INVENTION

A mechanism to simultaneously represent a Final Form format and an alternate Mark-Up format is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
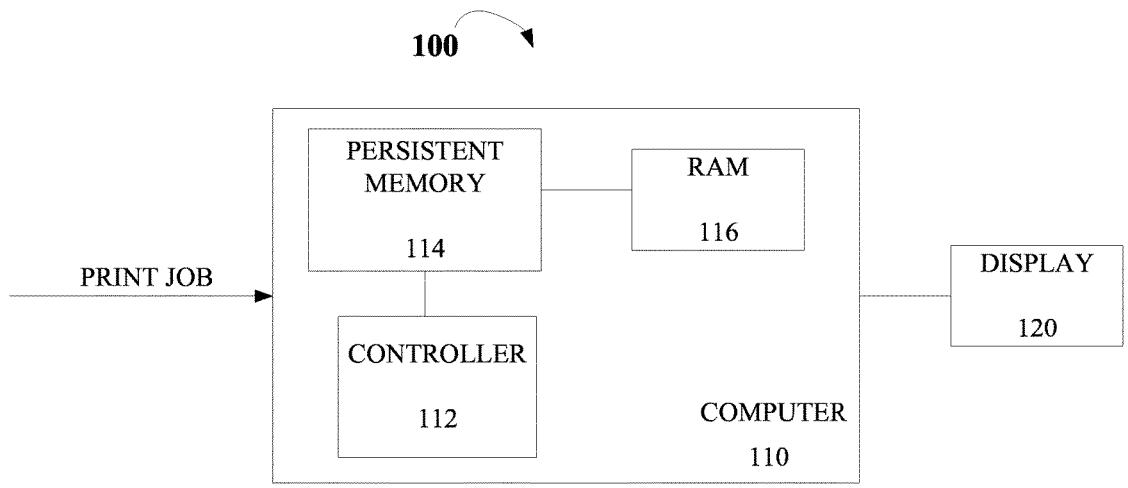
FIG. 1 is a block diagram illustrating one embodiment of a computer system.

FIG. 1 illustrates one embodiment of a computer system 100. Computer system 100 may be implemented by a print shop operator to generate and/or process print jobs. System 100 may include any system, device, or component operable to generate and/or process print data, such as a computer, a server, a network, etc. In this embodiment, system 100 comprises controller 112, persistent memory 114, and Random Access Memory (RAM) 116.

Controller 112 manages the operations of computer 110, and may be implemented, for example, as custom circuitry or as a processor executing programmed instructions. Controller 112 may use persistent memory 114 (e.g., a disk drive) to store print data and/or indices for later retrieval. Controller 112 may use RAM 116 in order to actively load and process portions of AFP print data kept in persistent memory 114. Furthermore, controller 112 may utilize display 120 (e.g., a monitor, screen, etc.) in order to visually show indices or portions of print data to a user. Additional devices, such as audio devices or multimedia devices (e.g., televisions, etc.) may be used to provide information as desired. The particular arrangement, number, and configuration of components described herein is exemplary and non-limiting.

In one embodiment, system 100 processes Advanced Function Presentation (AFP) print jobs. Thus, system 100 utilizes the AFP format to store document data for print jobs, archival and other forms of presentation such as viewing. According to AFP standards, a print job is divided into AFP objects. Each AFP object may define a part of the print job, such as a document, a page, an image, text, etc. Further, AFP objects may be nested within one other. For example, an AFP document object may include multiple AFP page objects, and each AFP page object may include multiple text and/or graphical objects.

According to one embodiment, system 100 facilitates an inclusion of one or more alternate Mark-Up formats within Final Form format documents. In such an embodiment, the one or more alternate Mark-Up formats may be embedded within identified components of a Final Form document. However in other embodiments the alternate Mark-Up formats may be associated with the identified components of the Final Form document.

In a further embodiment, the document components may be independent pages within the document, groups of pages, or the entire document. In such an embodiment, the Final Form document component has a one-to-one correspondence with a document object in the alternate Mark-Up format (e.g., an article, chapter, or mail-piece). Additionally, the Final Form description language may include (e.g., embed or associate) alternate document content (or locations) with the Final Form document parts.

In still a further embodiment, each Mark-Up format version included within at a Final Form document component may be associated with different format versions. In this embodiment, each alternate mark-up version may be associated with a specific intended use, accessibility need or target device.

Figure 2:
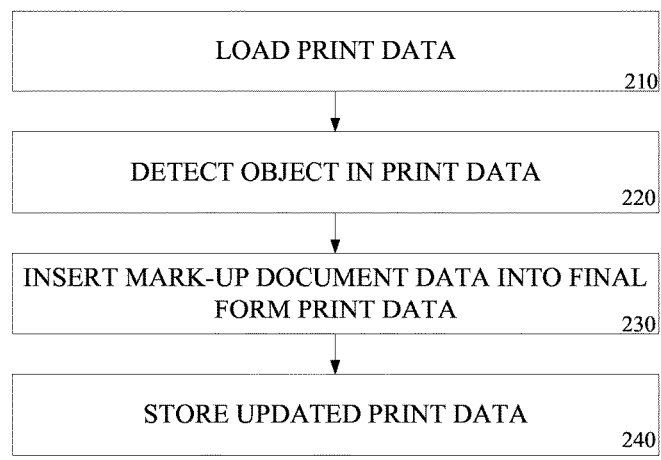
FIG. 2 is a flow diagram illustrating one embodiment of simultaneously representing Final Form and Mark-Up documents.

FIG. 2 is a flow diagram illustrating one embodiment of inserting Mark-Up format objects within a Final Form document. The process of FIG. 2 is described with reference to computer system 100. However embodiments may be implemented in other systems. Moreover, the process is described with reference to an AFP data stream, yet other embodiments may be implemented in other page description languages. The process of the flowcharts described herein is not all inclusive and may include other steps not shown. The steps described herein may also be performed in an alternative order.

At processing block 210, controller 112 loads AFP print data from persistent memory 114 into RAM 116. At processing block 220, an AFP object (e.g., an Object Container Data (OCD) structured field) is detected within the AFP print data. In one embodiment, the object is an Alternate Document Container Object (ALT_DOC) that is capable of including one or more alternate mark-up types (e.g., HTML, XHTML or XHTML+zip) into the AFP print data. In such an embodiment, the ALT_DOC Container Object is included at the beginning of each document component at which alternate Mark-Up format data is to be added.

Depending on size and intended use, the ALT_DOC Container Object may be included at the start of a document, page or group of pages such that one alternate mark-up document is associated with each "atomic" unit in the Final Form. For example, in a transaction environment there may be tens of thousands of individualized pages that have been grouped for delivery to each client or household. A bank statement may manifest as a three-page mail piece AND a single alternate mark-up (HTML) document representing the same content.

In general, the Mark-Up format is better suited to accommodate diverse needs such as accessibility or variations in screen size. Incorporating the Mark-Up format into the Final Form enables consumption of a document most appropriate for the circumstances and/or device. Thus an advantage of defining a new ALT_DOC Container type (e.g., versus extending the Metadata Object in AFP) is that the Mark-Up may be skipped in the conventional print production environment by looking at a Begin Object Container to determine type (ALT_DOC) without opening the object itself.

At processing block 230, Mark-Up format data is inserted into the AFP document data that corresponds to the object. In one embodiment, insertion of the Mark-Up format data includes embedding the Mark-Up format data within the ALT_DOC Container Object. FIG. 3 illustrates one embodiment of Mark-Up format data embedded within the ALT_DOC Container Object. As shown in FIG. 3, an ALT_DOC Container Object 310 is defined as having an Alt-type=HTML+zip format 320, as well as Object Container Data 330. In this embodiment the Object Container Data 330 includes an embedded Mark-Up format.

In some cases, replicating content in both final form and mark-up may result in unacceptable document bloat and/or performance issues. To address this, some embodiments enable the ALT_DOC container object to link (e.g., URL, local-ID, etc.) to an external alternate Mark-Up. FIG. 4 illustrates one embodiment of Mark-Up format data linked to the ALT_DOC Container Object.

As shown in FIG. 4, an ALT_DOC Container Object 310 is defined as having an Alt-loc=URL format 420 indicating a URL link is to be implemented. In this embodiment the Object Container Data 430 includes a URL link to an external Mark-Up format. Linking has the advantage of not repeating data elements within the final form document. In other embodiments, additional addressing schemes may be identified for Alt-loc (e.g., Local-ID, FQN, etc.).

Some processing environments may be unable to deal with a new container object appearing at the start of each document component. Thus in some embodiments, a multi-part index is established that spans the Final Form document and links document components (e.g., Page, Page Group or Document) with an associated Mark-Up formats. In such embodiments, this index may reside at the front of a document or print file thereby allowing the controller 112 to easily skip over or bypass any Mark-Up while performing sensitive rendering in the print environment.

Figures 5, 6:
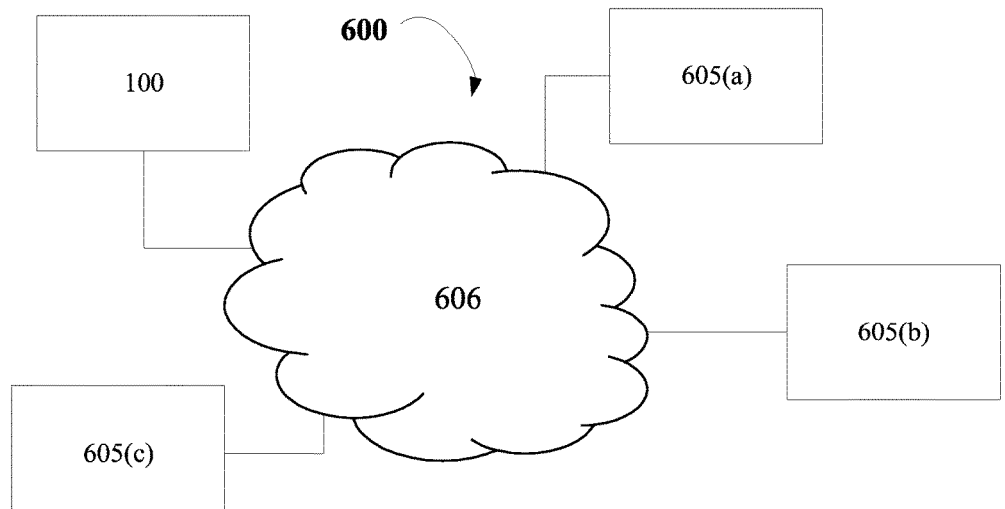
FIG. 5 illustrates one embodiment of code implemented to simultaneously represent Final Form and Mark-Up documents.
FIG. 6 illustrates one embodiment of a network.

FIG. 5 illustrates one embodiment of an indexed Mark-Up format. In this embodiment, an AltDocIndex Container Object 510 is defined. Further, Object Container Data 530 includes a multi-part index table including the document component (Doc-part), type (e.g., embedded or linked) and location for Mark-Up document formatting. Referring back to FIG. 2, the updated print data is stored in memory 214 at processing block 240. At some time later, during processing of the update AFP print data, the Final Form print data is presented. As discussed above, the ALT_DOC Container Objects are disregarded during print processing. Resulting in only the Final Form document being printed. However for data received at a device, the applicable alternative Mark-Up format may be presented.

At some time after the Final Form document with the inserted Mark-Up format objects has been generated, the document may subsequently be received at one or more presentation devices. FIG. 6 illustrates one embodiment of a data processing system network 600 having computer system 100 and presentation devices 605 coupled via a network 606. In one embodiment the presentation devices 605 are computing devices, such as a desktops, laptops, tablet computers, smartphones, head-mounted displays and other wearable devices, and/or the like, having a display device.

Once received at a presentation device 605, the document is rendered on the display device according to a format indicated by a corresponding Mark-Up format object in the document. For instance, presentation device 605(a), 605(b) and 605(c) may all receive the document and render the document according to separate Mark-Up format objects in the document. In one embodiment, presentation device 605(a) may render the document in a format optimized for a sighted user, while presentation device 605(b) and 605(c) render the document in formats optimized for a blind user (e.g., annunciation) and a color blind user, respectively.

Figure 7:
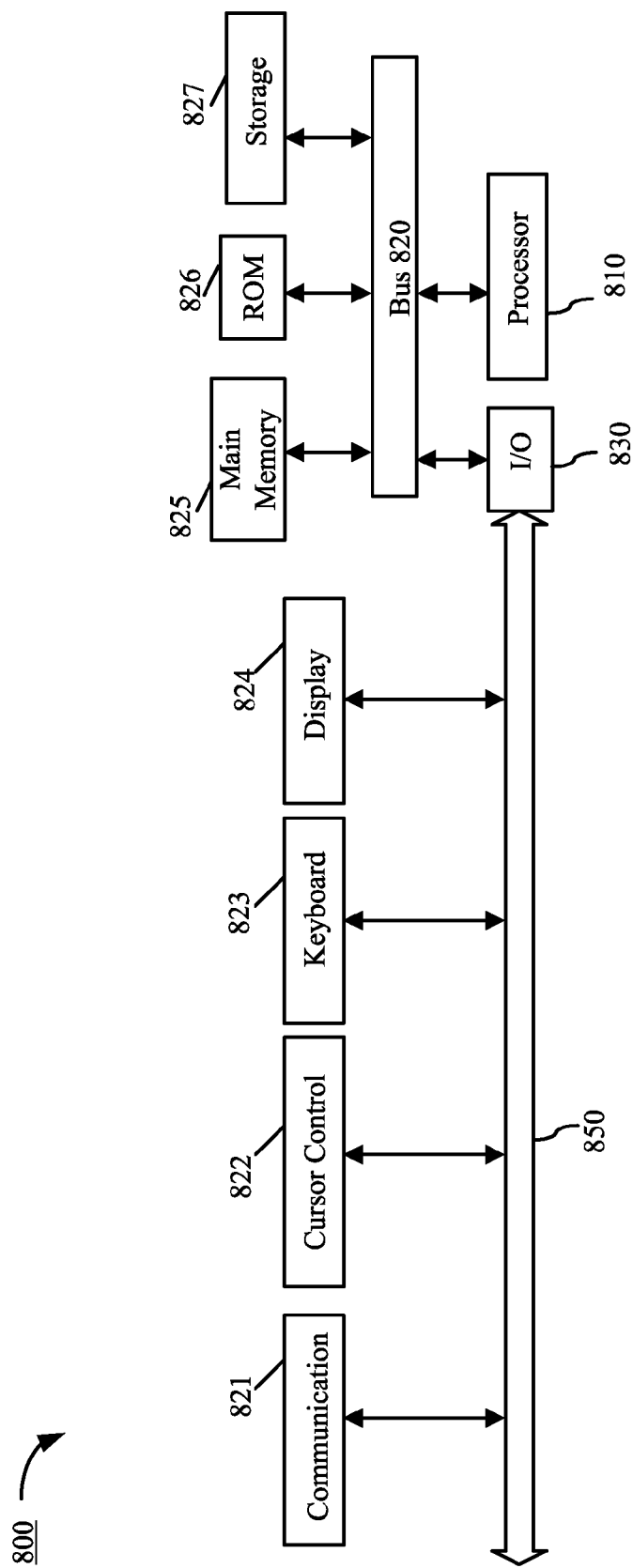
FIG. 7 illustrates one embodiment of a computer system.

FIG. 7 illustrates a computer system 800, representing a full system at which computer system 100, or presentation devices 605, may be implemented. Computer system 800 includes a system bus 820 for communicating information, and a processor 810 coupled to bus 820 for processing information. According to one embodiment, processor 810 is implemented using one of multitudes of microprocessors. Nevertheless one of ordinary skill in the art will appreciate that other processors may be used.

Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and or other static storage device 826 coupled to bus 820 for storing static information and instructions used by processor 810.

A data storage device 827 such as a magnetic disk or optical disc and its corresponding drive may also be coupled to computer system 800 for storing information and instructions. Computer system 800 can also be coupled to a second I/O bus 850 via an I/O interface 830. A plurality of I/O devices may be coupled to I/O bus 850, including a display device 824, an input device (e.g., an alphanumeric input device 823 and or a cursor control device 822). The communication device 821 is for accessing other computers (servers or clients) via an external data network, for example. The communication device 821 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims that follow.

What is claimed:

1. A non-transitory machine-readable medium having instructions, which when executed by a machine, causes the machine to:
   receive print data;
   detect Final Form presentation document data within the print data;
   insert a plurality of Mark-Up formats at each of one or more document components identified in the document data, wherein each of the Mark-Up formats associates a document component with a different format version; and
   transmit the print data for rendering at a presentation device.

2. The machine-readable medium of claim 1, having instructions, which when executed by the machine, further causes the machine to detect one or more objects within document data, each identifying a document component to insert the Mark-Up formats.

3. The machine-readable medium of claim 2, wherein the objects comprise Alternate Document Container Objects included at the beginning of each document component.

4. The machine-readable medium of claim 3, wherein each Alternate Document Container Object includes object container data.

5. The machine-readable medium of claim 4, wherein the object container data comprises the one or more embedded alternate Mark-Up formats.

6. The machine-readable medium of claim 4, wherein the object container data comprises one or more links to the one or more external alternate Mark-Up formats.

7. The machine-readable medium of claim 4, wherein the object container data comprises a multi-part index to link the one or more document components.

8. The machine-readable medium of claim 4, wherein the one or more document components comprise a first document component.

9. The machine-readable medium of claim 8, wherein the first document component comprises one or more of: independent pages within a document, groups of pages, or the entire document.

10. The machine-readable medium of claim 9, wherein the first document component has a one-to-one correspondence with an Alternate Document Container Object.

11. The machine-readable medium of claim 10, wherein the first document component comprises an Alternate Document Container Object having a first object container data indicating a first Mark-Up format and a second object container data indicating a second Mark-Up format.

12. The machine-readable medium of claim 10, wherein the first Mark-Up format corresponds to a first intended use, accessibility need or target device, and the second Mark-Up format corresponds to a second intended use, accessibility need or target device.

13. A system comprising:
a machine readable medium to store print data;
a controller to detect Final Form presentation document data within the print data, insert a plurality of Mark-Up formats at each of one or more document components identified in the document data and transmit the print data for rendering, wherein each of the Mark-Up formats associates a document component with a different format version; and
a display device to present the document data in a format indicated by the Mark-Up formats.

14. The system of claim 13, wherein the controller further detects one or more objects within the document data, each identifying a document component to insert the Mark-Up formats.

15. The system of claim 14, wherein the objects comprise Alternate Document Container Objects included at the beginning of each document component, and wherein each Alternate Document Container Object includes object container data.

16. The system of claim 15, wherein the object container data comprises the one or more embedded alternate Mark-Up formats.

17. The system of claim 15, wherein the object container data comprises one or more links to the one or more external alternate Mark-Up formats.

18. The system of claim 15, wherein the object container data comprises a multi-part index to link the one or more document components.

19. The system of claim 15, wherein the one or more document components comprise a first document component.

20. The system of claim 19, wherein the first document component comprises an Alternate Document Container Object having first object container data indicating a first Mark-Up format and second object container data indicating a second Mark-Up format.

21. A system comprising:
a computer system, including a processor to receive a Final Form presentation document data including a plurality of Mark-Up formats at each of one or more document components identified in the document data, wherein each of the Mark-Up formats associates a document component with a different format version; and
a first display device to receive the Final Form presentation document data and render the document data according to a first Mark-Up format.

22. The system of claim 21, further comprising a second display device to receive the Final Form presentation document data and render the document data according to a second Mark-Up format.

23. The system of claim 22, wherein the presentation document data includes one or more objects within document data, each identifying a document component at which to insert the first Mark-Up format and the second Mark-Up format.

24. The system of claim 23, wherein the one or more document components comprise a first document component, wherein the first document component comprises an Alternate Document Container Object having a first object container data indicating a first Mark-Up format and a second object container data indicating a second Mark-Up format.

25. The system of claim 24, wherein the first Mark-Up format corresponds to a first intended use, accessibility need or target device, and the second Mark-Up format corresponds to a second intended use, accessibility need or target device.

* * * * *